US006772298B2

(12) United States Patent
Khare et al.

(10) Patent No.: US 6,772,298 B2
(45) Date of Patent: Aug. 3, 2004

(54) METHOD AND APPARATUS FOR INVALIDATING A CACHE LINE WITHOUT DATA RETURN IN A MULTI-NODE ARCHITECTURE

(75) Inventors: Manoj Khare, Saratoga, CA (US); Akhilesh Kumar, Sunnyvale, CA (US); Ken Creta, Gig Harbor, WA (US); Lily P. Looi, Portland, OR (US); Robert T. George, Austin, TX (US); Michel Cekleov, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 09/739,667

(22) Filed: Dec. 20, 2000

(65) Prior Publication Data

US 2002/0078305 A1 Jun. 20, 2002

(51) Int. Cl.[7] .............................................. G06F 12/00
(52) U.S. Cl. ....................... 711/144; 711/120; 711/141; 711/145; 711/159
(58) Field of Search ................................ 711/144, 120, 711/141, 145, 159

(56) References Cited

U.S. PATENT DOCUMENTS

| 5,485,579 | A | 1/1996 | Hitz et al. ............. 395/200.12 |
| 5,495,419 | A | 2/1996 | Rostoker et al. ............ 364/468 |
| 5,535,116 | A | 7/1996 | Gupta et al. ................. 364/134 |
| 5,541,914 | A | 7/1996 | Krishnamoorthy et al. ... 370/56 |
| 5,551,048 | A | 8/1996 | Steely, Jr. ................... 395/800 |
| 5,557,533 | A | 9/1996 | Koford et al. .............. 364/491 |
| 5,581,729 | A | 12/1996 | Nishtala et al. ............. 395/470 |
| 5,588,131 | A | 12/1996 | Borrill ......................... 395/473 |
| 5,588,132 | A | 12/1996 | Cardoza ...................... 395/475 |
| 5,588,152 | A | 12/1996 | Dapp et al. ................. 395/800 |
| 5,590,292 | A | 12/1996 | Wooten et al. ............. 395/825 |
| 5,590,345 | A | 12/1996 | Barker et al. ............... 395/800 |
| 5,594,918 | A | 1/1997 | Knowles et al. ............ 395/800 |
| 5,603,005 | A | 2/1997 | Bauman et al. ............. 395/451 |
| 5,613,136 | A | 3/1997 | Casavant et al. ........... 395/800 |
| 5,617,537 | A | 4/1997 | Yamada et al. ......... 395/200.01 |
| 5,625,836 | A | 4/1997 | Barker et al. ............... 395/800 |
| 5,634,004 | A | 5/1997 | Gopinath et al. ...... 395/200.02 |
| 5,634,068 | A | 5/1997 | Nishtala et al. ............. 395/800 |
| 5,636,125 | A | 6/1997 | Rostoker et al. ....... 364/468.28 |
| 5,644,753 | A | 7/1997 | Ebrahim et al. ............ 395/458 |
| 5,655,100 | A | 8/1997 | Ebrahim et al. ............ 395/471 |
| 5,657,472 | A | 8/1997 | Van Loo et al. ............ 395/485 |
| 5,678,026 | A | 10/1997 | Vartti et al. ................. 395/479 |
| 5,680,571 | A | 10/1997 | Bauman ...................... 395/449 |
| 5,680,576 | A | 10/1997 | Laudon ....................... 395/472 |

(List continued on next page.)

OTHER PUBLICATIONS

Dubois et al., "Effects of Cache Coherency in Multiprocessors," pp 299–308, IEEE, 1982.
Related U.S. patent application Ser. No. 09/672,454, filed Sep. 29, 2000.
Related U.S. patent application Ser. No. 09/641,708, filed Aug. 21, 2000.

*Primary Examiner*—Matthew Kim
*Assistant Examiner*—Stephen Elmore
(74) *Attorney, Agent, or Firm*—Kenyon & Kenyon

(57) ABSTRACT

A method of invalidating a cache line in a system having a plurality of nodes that include a processor and a cache memory. A request to invalidate a cache line that is caching a particular memory block is sent from a first node. The request is a request to invalidate a cache line in another node without returning to the first node the data stored in a cache line to be invalidated. In an embodiment, the data in the cache line to be invalidated is not returned to the first node even if the cache line is in the modified state. In a further embodiment, new data is written to a cache line in the first node that is caching the particular memory block without writing old data that was stored in that cache line back to a memory.

19 Claims, 5 Drawing Sheets

U.S. PATENT DOCUMENTS

| | | | |
|---|---|---|---|
| 5,682,322 A | 10/1997 | Boyle et al. | 364/491 |
| 5,682,512 A | 10/1997 | Tetrick | 395/412 |
| 5,684,977 A | 11/1997 | Van Loo et al. | 395/470 |
| 5,699,500 A | 12/1997 | Dasgupta | 395/180 |
| 5,701,313 A | 12/1997 | Purdham | 371/40.2 |
| 5,701,413 A | 12/1997 | Zulian et al. | 395/200.02 |
| 5,708,836 A | 1/1998 | Wilkinson et al. | 395/800 |
| 5,710,935 A | 1/1998 | Barker et al. | 395/800 |
| 5,713,037 A | 1/1998 | Wilkinson et al. | 395/800 |
| 5,717,942 A | 2/1998 | Haupt et al. | 395/800 |
| 5,717,943 A | 2/1998 | Barker et al. | 395/800 |
| 5,717,944 A | 2/1998 | Wilkinson et al. | 395/800 |
| 5,734,921 A | 3/1998 | Dapp et al. | 395/800.1 |
| 5,734,922 A | 3/1998 | Hagersten et al. | 395/800.37 |
| 5,742,510 A | 4/1998 | Rostoker et al. | 364/468.03 |
| 5,745,363 A | 4/1998 | Rostoker et al. | 364/468.28 |
| 5,749,095 A | 5/1998 | Hagersten | 711/141 |
| 5,752,067 A | 5/1998 | Wilkinson et al. | 395/800.16 |
| 5,754,789 A | 5/1998 | Nowatzyk et al. | 395/200.63 |
| 5,754,871 A | 5/1998 | Wilkinson et al. | 395/800 |
| 5,754,877 A | 5/1998 | Hagersten et al. | 395/800.29 |
| 5,761,523 A | 6/1998 | Wilkinson et al. | 395/800.2 |
| 5,765,011 A | 6/1998 | Wilkinson et al. | 395/800.2 |
| 5,781,439 A | 7/1998 | Rostoker et al. | 364/468.28 |
| 5,784,697 A | 7/1998 | Funk et al. | 711/170 |
| 5,787,094 A | 7/1998 | Cecchi et al. | 371/53 |
| 5,793,644 A | 8/1998 | Koford et al. | 364/491 |
| 5,794,059 A | 8/1998 | Barker et al. | 395/800.1 |
| 5,796,605 A | 8/1998 | Hagersten | 365/134 |
| 5,802,578 A | 9/1998 | Lovett | 711/147 |
| 5,805,839 A | 9/1998 | Singhal | 395/292 |
| 5,815,403 A | 9/1998 | Jones et al. | 364/489 |
| 5,842,031 A | 11/1998 | Barker et al. | 395/800 |
| 5,848,254 A | 12/1998 | Hagersten | 395/383 |
| 5,857,113 A | 1/1999 | Muegge et al. | 395/830 |
| 5,860,159 A | 1/1999 | Hagersten | 711/151 |
| 5,862,316 A | 1/1999 | Hagersten et al. | 395/182.13 |
| 5,864,738 A | 1/1999 | Kessler et al. | 395/200.69 |
| 5,867,649 A | 2/1999 | Larson | 395/200.31 |
| 5,870,313 A | 2/1999 | Boyle et al. | 364/491 |
| 5,870,619 A | 2/1999 | Wilkinson et al. | 395/800.2 |
| 5,875,117 A | 2/1999 | Jones et al. | 364/491 |
| 5,875,201 A | 2/1999 | Bauman et al. | 371/49.1 |
| 5,875,462 A * | 2/1999 | Bauman et al. | 711/119 |
| 5,875,472 A | 2/1999 | Bauman et al. | 711/150 |
| 5,878,241 A | 3/1999 | Wilkinson et al. | 395/379 |
| 5,878,268 A | 3/1999 | Hagersten | 395/800.28 |
| 5,881,303 A | 3/1999 | Hagersten et al. | 395/800.3 |
| 5,887,138 A | 3/1999 | Hagersten et al. | 395/200.45 |
| 5,887,146 A | 3/1999 | Baxter et al. | 395/284 |
| 5,892,970 A | 4/1999 | Hagersten | 395/825 |
| 5,897,657 A | 4/1999 | Hagersten et al. | 711/145 |
| 5,900,020 A | 5/1999 | Safranek et al. | 711/167 |
| 5,903,461 A | 5/1999 | Rostoker et al. | 364/468.28 |
| 5,905,881 A | 5/1999 | Tran et al. | 395/395 |
| 5,905,998 A | 5/1999 | Ebrahim et al. | 711/144 |
| 5,911,052 A | 6/1999 | Singhal et al. | 395/293 |
| 5,914,887 A | 6/1999 | Scepanovic et al. | 364/491 |
| 5,922,063 A | 7/1999 | Olnowich et al. | 710/132 |
| 5,925,097 A | 7/1999 | Gopinath et al. | 709/200 |
| 5,931,938 A | 8/1999 | Drogichen et al. | 712/15 |
| 5,938,765 A | 8/1999 | Dove et al. | 713/1 |
| 5,941,967 A | 8/1999 | Zulian | 710/107 |
| 5,943,150 A | 8/1999 | Deri et al. | 359/133 |
| 5,946,710 A | 8/1999 | Bauman et al. | 711/129 |
| 5,950,226 A | 9/1999 | Hagersten et al. | 711/124 |
| 5,958,019 A | 9/1999 | Hagersten et al. | 709/400 |
| 5,960,455 A | 9/1999 | Bauman | 711/120 |
| 5,961,623 A | 10/1999 | James et al. | 710/113 |
| 5,963,745 A | 10/1999 | Collins et al. | 395/800.13 |
| 5,963,746 A | 10/1999 | Barker et al. | 395/800.2 |
| 5,963,975 A | 10/1999 | Boyle et al. | 711/147 |
| 5,964,886 A | 10/1999 | Slaughter et al. | 714/4 |
| 5,966,528 A | 10/1999 | Wilkinson et al. | 395/563 |
| 5,971,923 A | 10/1999 | Finger | 600/437 |
| 5,978,578 A | 11/1999 | Azarya et al. | 395/701 |
| 5,978,874 A | 11/1999 | Singhal et al. | 710/107 |
| 5,983,326 A | 11/1999 | Hagersten et al. | 711/147 |
| 5,999,734 A | 12/1999 | Willis et al. | 395/706 |
| 6,026,461 A | 2/2000 | Baxter et al. | 710/244 |
| 6,038,646 A | 3/2000 | Sproull | 711/158 |
| 6,038,651 A | 3/2000 | VanHuben et al. | 712/21 |
| 6,041,376 A | 3/2000 | Gilbert et al. | 710/108 |
| 6,049,845 A | 4/2000 | Bauman et al. | 710/113 |
| 6,049,853 A | 4/2000 | Kingsbury et al. | 711/147 |
| 6,052,760 A | 4/2000 | Bauman et al. | 711/119 |
| 6,055,617 A | 4/2000 | Kingsbury | 711/203 |
| 6,065,037 A | 5/2000 | Hitz et al. | 709/200 |
| 6,065,077 A | 5/2000 | Fu | 710/100 |
| 6,081,844 A | 6/2000 | Nowatzyk et al. | 709/233 |
| 6,085,295 A | 7/2000 | Ekanadham et al. | 711/145 |
| 6,092,136 A | 7/2000 | Luedtke | 710/107 |
| 6,092,156 A | 7/2000 | Schibinger et al. | 711/145 |
| 6,094,715 A | 7/2000 | Wilkinson et al. | 712/20 |
| 6,108,739 A | 8/2000 | James et al. | 710/113 |
| 6,119,215 A | 9/2000 | Key et al. | 712/19 |
| 6,141,733 A | 10/2000 | Arimilli et al. | 711/141 |
| 6,148,361 A | 11/2000 | Carpenter et al. | 710/260 |
| 6,155,725 A | 12/2000 | Scepanovic et al. | 395/500.1 |
| 6,161,191 A | 12/2000 | Slaughter et al. | 714/4 |
| 6,167,489 A | 12/2000 | Bauman et al. | 711/145 |
| 6,171,244 B1 | 1/2001 | Finger et al. | 600/437 |
| 6,173,386 B1 | 1/2001 | Key et al. | 712/10 |
| 6,173,413 B1 | 1/2001 | Slaughter et al. | 714/6 |
| 6,182,112 B1 | 1/2001 | Malek et al. | 709/201 |
| 6,189,078 B1 | 2/2001 | Bauman et al. | 711/156 |
| 6,189,111 B1 | 2/2001 | Alexander et al. | 714/8 |
| 6,192,452 B1 | 2/2001 | Bannister et al. | |
| 6,199,135 B1 | 3/2001 | Maahs et al. | 710/129 |
| 6,199,144 B1 | 3/2001 | Arora et al. | 711/145 |
| 6,205,528 B1 | 3/2001 | Kingsbury et al. | 711/170 |
| 6,209,064 B1 | 3/2001 | Weber | 711/141 |
| 6,212,610 B1 | 4/2001 | Weber et al. | 711/164 |
| 6,226,714 B1 | 5/2001 | Safranek et al. | 711/119 |
| 6,269,428 B1 | 7/2001 | Carpenter et al. | |
| 6,279,085 B1 | 8/2001 | Carpenter et al. | |
| 6,519,685 B1 | 2/2003 | Chang | 711/141 |

* cited by examiner

METHOD AND APPARATUS FOR INVALIDATING A CACHE LINE WITHOUT DATA RETURN IN A MULTI-NODE ARCHITECTURE

FIELD OF THE INVENTION

Embodiments of the present invention relate to a computer system having a multi-node computer architecture. In particular, the present invention relates to a method and apparatus for invalidating cache lines in a multi-node architecture.

BACKGROUND

Computer systems may contain multiple processors that may work together to perform a task. For example, a computer system may contain four processors that may share system resources (e.g., input devices or memory devices) and may perform parallel processing. The processors may send messages to each other, may send messages to system resources, and may send and receive messages from the system resources. For example, such messages may include requests for information that is stored at a memory location in a memory device.

In many computer systems, the set of data currently being used by a microprocessor may be copied from a system memory device such as a dynamic random access memory (DRAM) into a relatively smaller but faster cache memory device such as a static random access memory (SRAM). The cache memory device is usually private to each processor such that only one processor can read or write to it. As would be appreciated by a person of skill in the art, a "cache line" is a single data entry in a cache memory device ("cache"). That is, a cache line may be the size of the data unit accessed in the cache, in which case the cache line corresponds to a particular block of data in a system memory ("memory block"). A cache line may be said to cache data for a particular memory block if the cache line contains the data element for that memory block. A memory block corresponds to a unit of system memory and may contain one or more data locations (e.g., 32 bytes). A processor may write to a memory block by writing to the corresponding cache line, in which case the cache line and the system memory may contain different values.

A cache is said to be "coherent" if the information resident in the cache reflects a consistent view of the information in all the private cache memory devices and the system memory. If the cache has been updated without updating the system memory, then the system memory is said to contain "stale" data. Similarly, if the system memory has been updated without updating the cache, then the cache is said to contain "stale" data. As discussed above, a cache and a system memory do not always need to contain exact copies of one another. A cache line may be said to be in a "modified" state if has been updated without updating the system memory. If a processor determines that a cache line contains stale data, the processor may "invalidate" that cache line. In some systems, a cache line may be invalidated by setting a flag associated with that cache line to an invalid value. In such systems, when the cache line is invalidated, the cache controller does not use that cache line until a new data element is stored in the cache line.

A processor should not be allowed to use a stale copy of data. Cache "snooping" is one technique used in some systems that have multiple processors to detect the state of a memory location in private cache memory devices on a memory access that might cause a cache coherency problem. Snooping may include the monitoring of a system bus by a first processor to determine if a second processor is accessing a block of system memory that is being cached in the first processor. If a system does not contain a shared bus, processors cannot snoop by monitoring a shared bus, and another method of preventing the use of stale data must be used.

DETAILED DESCRIPTION

Figure 1:
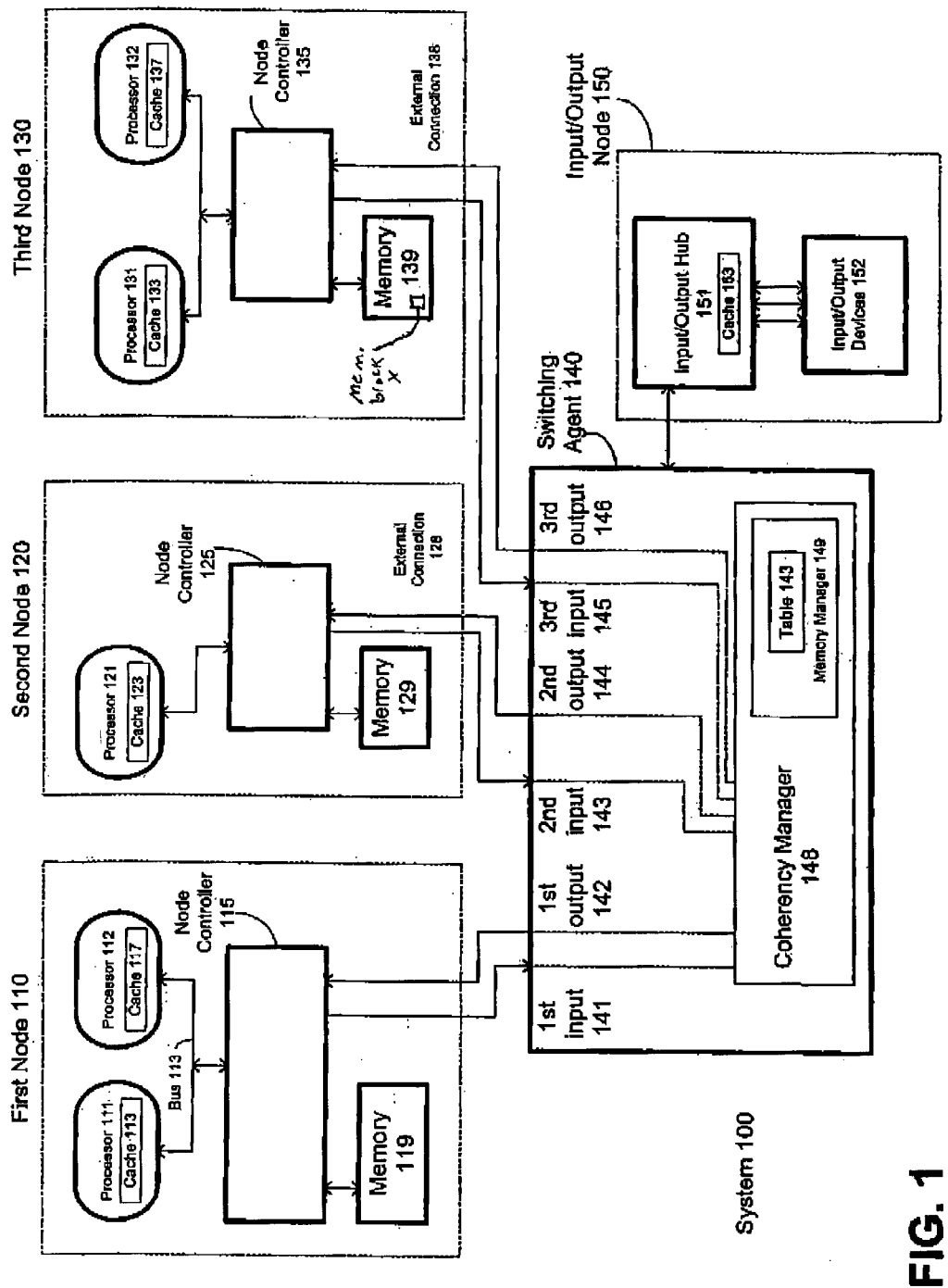
FIG. 1 is a partial block diagram of a system having a node that sends messages according to an embodiment of the present invention.

Embodiments of the present invention relate to methods and apparatus of invalidating cache lines in a multi-node system. FIG. 1 is a partial block diagram of a system having nodes that share memory devices according to an embodiment of the present invention. FIG. 1 shows a system 100 which is a computer system that includes processors, memory devices, and input/output devices. Components in system 100 are arranged into architectural units that are referred to herein as "nodes." Each node may contain one or more processors, memories, or input/output devices. In addition, the components within a node may be connected to other components in that node though one or more busses or lines. Each node in system 100 has a node connection that may be used by the components within that node to communicate with components in other nodes. In one embodiment, the node connection for a particular node is used for any communication from a component within that node to another node. In system 100, the node connection for each node is connected to a switching agent 140. A system that has multiple nodes is referred to as a multi-node system. A multi-node system for which each node communicates to other nodes though a dedicated connection may be said to have a point-to-point architecture.

The nodes in system 100 may cache data for the same memory block for one of the memories in the system. For example, a cache in each node in the system may contain a data element corresponding to a block of a system memory (e.g., a RAM memory that is located in one of the nodes). If a first node decides to modify its copy of this memory block, it may invalidate the copies of that block that are in other nodes (i.e., invalidate the cache lines) by sending an invalidate message to the other nodes. If the first node attempts to invalidate a cache line in the other nodes, and the second node has already modified that cache line, then the first node may read the new cache line from the second node before invalidating the cache line in the second node. In this way, the first node may obtain the updated data for that cache line from the second node before the first node operates on that data. After obtaining the updated data, the first node may invalidate the cache line in the second node. To accomplish this, the first node may send a read-and-invalidate request to the second node.

In an embodiment of the present invention, the first node may not need to obtain the updated data from the second node, even if the second node had modified the cache line being used by the first node, because the first node may not need to use any updates to the cache line. In this case, the first node may send an invalidate without data return request. For example, the first node may wish to store graphics data in the cache line, or data from an I/O device in the cache line, and overwrite any data that was already in the cache line.

The details shown in FIG. 1 will now be discussed. As shown in FIG. 1, system 100 includes a first node 110, a second node 120, a third node 130, and an input/output node 150. Each of these nodes is coupled to switching agent 140. The term "coupled" encompasses a direct connection, an indirect connection, an indirect communication, etc. First node 110 is coupled to switching agent 140 through first input 141 and first output 142, second node 120 is coupled to switching agent 140 through second input 143 and second output 144, and third node 130 is coupled to switching agent 140 through third input 145 and third output 146.

First node 110 includes processor 111, processor 112, and node controller 115, which are coupled to each other by bus 113. Processor 111 and processor 112 may be any microprocessors that are capable of processing instructions, such as for example a processor in the INTEL PENTIUM family of processors. Bus 113 may be a shared bus. First node 110 also contains a memory 119 which is coupled to node controller 115. Memory 119 may be a Random Access Memory (RAM). Processor 111 may contain a cache 113, and processor 112 may contain a cache 117. Cache 113 and cache 117 may be Level 2 (L2) cache memories that are comprised of static random access memory.

Similarly, second node 120 contains a processor 121 and node controller 125 which are coupled to each other. Second node 120 also contains a memory 129 that is coupled to node controller 125. Third node 130 contains a processor 131, processor 132, and node controller 135 that are coupled to each other. Third node 130 also contains a memory 139 that is coupled to node controller 135. Processor 121 may contain a cache 123, processor 131 may contain a cache 133, and processor 132 may contain a cache 137. Processors 121, 131, and 132 may be similar to processors 111 and 112. In an embodiment, two or more of processors 111, 112, 121, 131, and 132 are capable of processing a program in parallel. Node controllers 125 and 135 may be similar to node controller 115, and memory 129 and 139 may be similar to memory 119. As shown in FIG. 1, third node 130 may contain processors in addition to 131 and 132. Similarly, fist node 110 and second node 120 may also contain additional processors (e.g., first node 110 may contain 16 processors).

In one embodiment, switching agent 140 may be a routing switch for routing messages within system 100. As shown in FIG. 1, switching agent 140 contains a coherency manager 148 which may be used to process requests relating to cache coherency, such as snoop requests and invalidate requests. Coherency manager 148 may include hardware, such as circuits that are wired to perform operations, or program instructions, such as firmware that performs operations. Coherency manager 148 may contain a memory manager 149 which may be adapted to identify nodes that contain a copy of information stored in a memory block. Memory manager 149 may include a table 143 in a memory that is used to determine which nodes are caching a particular memory block. In an embodiment, coherency manager 148 and memory manager 149 both use a processor in switching agent 140.

As shown in FIG. 1, input/output node 150 contains an input/output hub 151 that is coupled to one or more input/output devices 152. Input/output devices 152 may be, for example, any combination of one or more of a disk, network, printer, keyboard, mouse, graphics display monitor, or any other input/output device. Input/output hub 151 may be an integrated circuit that contains bus interface logic for interfacing with a bus that complies to the Peripheral Component Interconnect standard or any other Input/Output standard. Input/output hub 151 may contain a cache 153. Input/output hub 151 may be similar to, for example, the INTEL 82801AA I/O Controller Hub.

In an embodiment, node controller 115, switching agent 140, and input/output hub 151 may be a chipset that provides the core functionality of a motherboard, such as a modified version of a chipset in the INTEL 840 family of chipsets.

In a further embodiment, inter-node communication in system 100 is asynchronous (i.e., there is no fixed timing between events) or may be source-synchronous. In a still further embodiment, inter-node communication is sent in the form of packets which may contain a header or a header and data sections. An example of a message size may be 144 bits. In an embodiment, the messages sent may include requests and responses. In a further embodiment, the types of requests that the nodes may send and receive may include a memory read request, memory write request, cache snoop request, cache flush request, memory update request, cache line replacement request, input/output port read request, and input/output port write request. Requests may contain fields such as a packet type, destination ID, request type, source ID, transaction address, request length, stream ID, and ordering semantics.

In an embodiment of the present invention, the processors in nodes 110, 120 and 130 may be shared memory multi-processors, and each of the memories 119, 129, and 139 may be part of the same shared physical address space. In a further embodiment, the processors in nodes 110, 120, and 130 communicate with each other through shared memory reads and writes (i.e., by writing to and reading from memory 119, 129 and 139). In an embodiment, the caches in nodes 110, 120 and 130 are kept coherent using the switching agent 140. For example, when processor 111 accesses a block in memory 119, it may send a snoop request for that memory block to switching agent 140, which may determine if any of the processors in second node 120 and third node 130 have cached that memory block. A snoop request may be generated when a processor needs other processors in the system to look in their own caches to see if a particular line is present in their cache.

Figure 2:
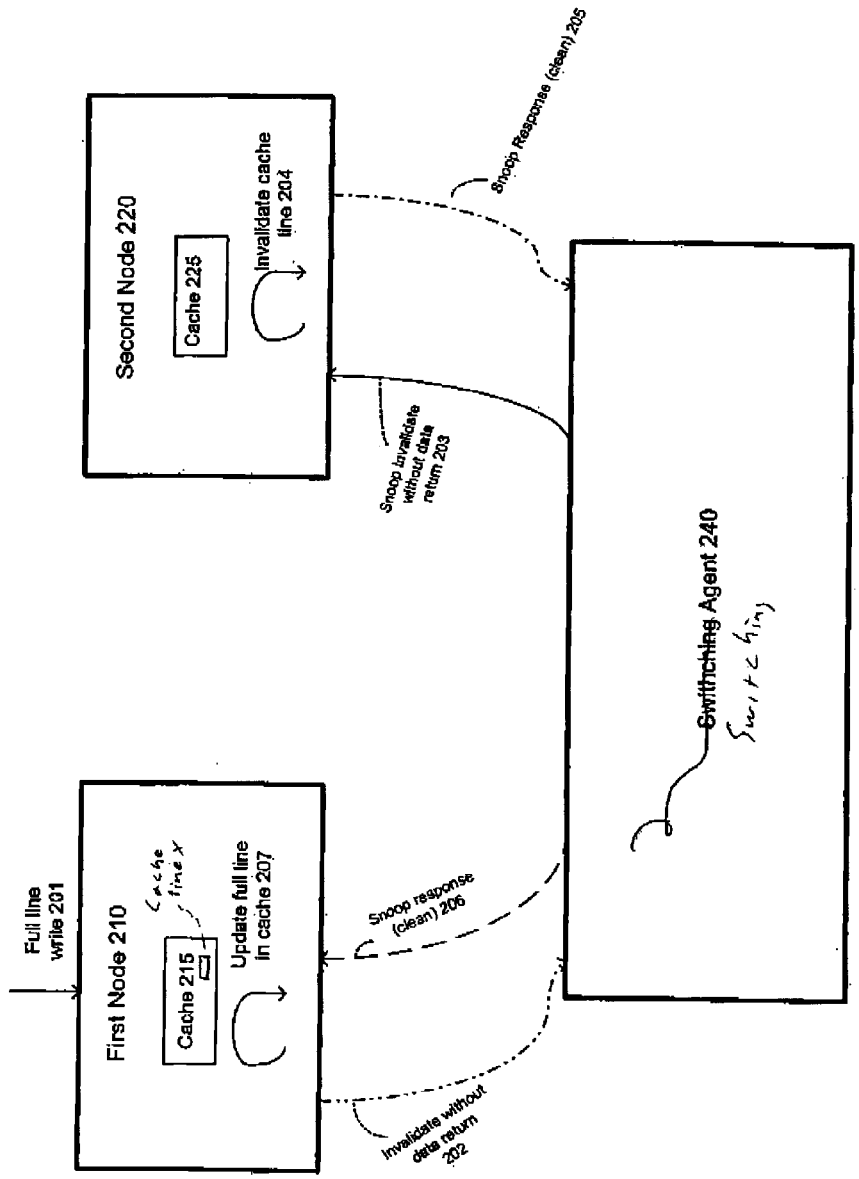
FIG. 2 is a partial block diagram showing an example of the invalidation of a clean cache line with no data return according to an embodiment of the present invention.

FIG. 2 is a partial block diagram showing an example of the invalidation of a clean cache line without data return according to an embodiment of the present invention. FIG. 2 shows the first node 210, second node 220, and switching agent 240 which are similar to those shown in FIG. 1. First node 210 has a cache 215, and second node 220 has a cache 225. FIG. 2 also shows a series of messages and actions 201–207, some of which are passed through switching agent 240 between first node 210 and second node 220. In this embodiment, the first node may write new data to a cache line, and messages may be sent to cause the other node to invalidate any other copies of the particular cache line that are present in the other nodes. In this example, first node 210 and second node 220 both have cached a memory block x (not shown). For example, memory block x may correspond to a data unit in memory 139 of third node 130 as shown in FIG. 1. Memory block x may be cached in cache 215 of first node 210 and cached in cache 225 of second node 220. In another embodiment, the system may contain additional nodes which may be caching the line in question.

According to the embodiment shown in FIG. 2, first node 210 may receive a request for a full line write 201. A full line write is a write request which updates the content of an entire cache line. The full line write 201 may be related, for example, to an input/output direct memory access (DMA) to the cache line x in cache 215. In the embodiment shown in FIG. 2, even if the cache line is in the modified state, first node 210 can write to the cache line without using (i.e., independent of) the modified data. In the embodiment shown, first node 210 sends an invalidate-without-data-return 202 command to switching agent 240. A coherency manager in switching agent 240 may determine that second node 210 is one of the nodes caching memory block x and may send a snoop invalidate-without-data-return 203 message to second node 220. In this embodiment, the cache line that is in the second node is clean (i.e., is the same as the corresponding value in memory). Second node 210 will then invalidate its copy of the cache line 204 and may send a snoop response (clean) 205 message to switching agent 240 to indicate that the cache line has been invalidated and that the line was clean. Switching agent 240 may then send a snoop response (clean) message to first node 220, the node that generated the invalidate request. First node 210 may then update the full line in the cache 207 with the new data.

Figure 3:
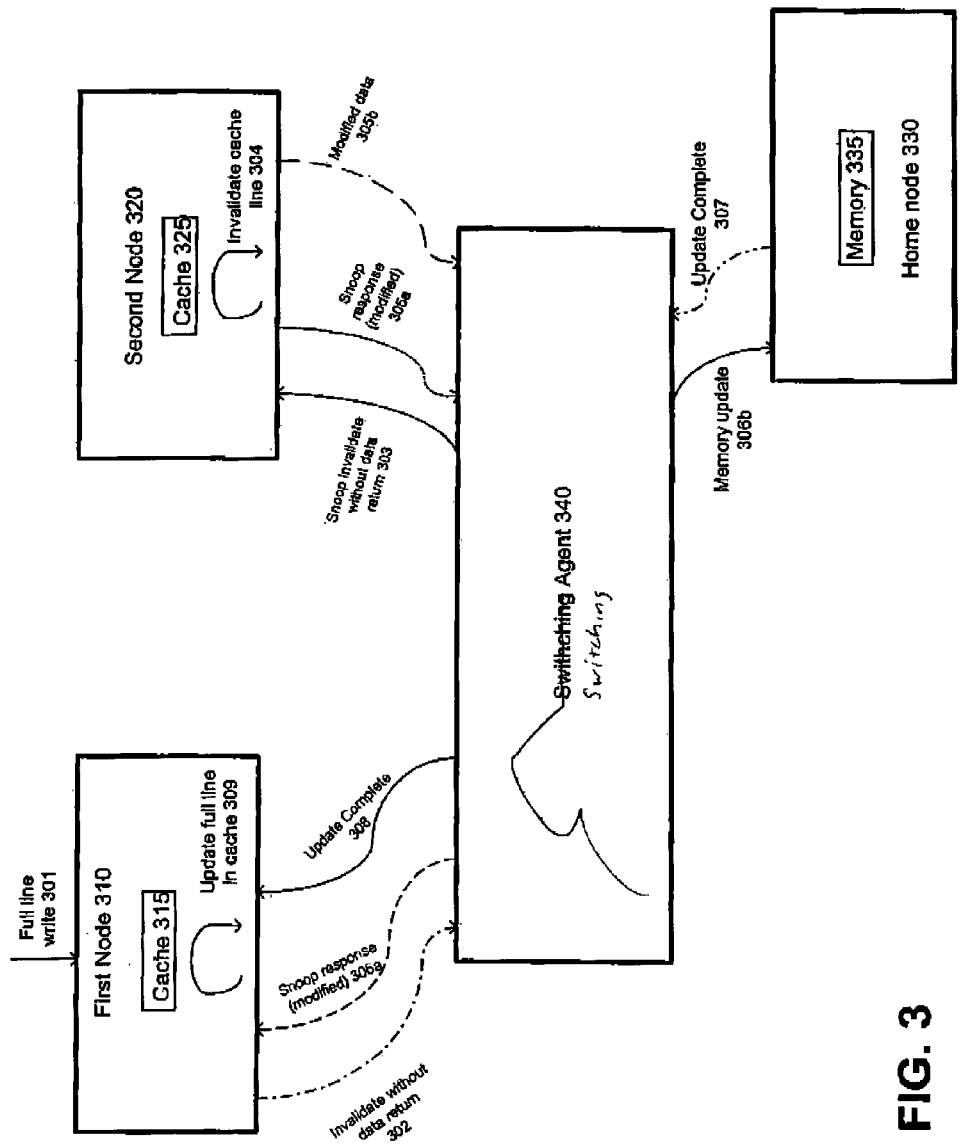
FIG. 3 is a partial block diagram showing an example of the invalidation of a modified cache line with no data return according to an embodiment of the present invention.

FIG. 3 is a partial block diagram showing an example of the invalidation of a modified cache line without data return according to an embodiment of the present invention. Similar to FIG. 2, FIG. 3 shows a first node 310, second node 320, and switching agent 340. First node 310 has a cache 315, and second node 320 has a cache 325. As in the example in FIG. 2, in the embodiment of FIG. 3 first node 310 and second node 320 both have cached a memory block x that corresponds to a location in a memory. In addition, FIG. 3 also shows a home node 330, the home node being the node which stores the memory location for the specified address. Home node 330 contains a memory 335 which may contain the cached location. In this embodiment, the cache line in cache 325 has a stale (i.e., modified) version of the cache line.

As in FIG. 2, first node 310 may receive a full line write 301 which may correspond to a request to write to cache line x data, such as graphics data. As discussed above, first node 310 may send an invalidate-without-data-return 302 command to switching agent 340. A coherency manager in switching agent 340 may determine that second node 320 is one of the nodes caching memory block x and sends a snoop invalidate-without-data-return 303 message to second node 320. The second node then invalidates the cache line 304. In this embodiment, the cache line that is in the second node is stale (i.e., modified), and the second node therefore sends a snoop response (modified) 305a to the switching agent 340 and, at the same time or substantially the same time, sends a modified data 305b message to the switching agent 340. In other embodiments, the snoop response (modified) 305a and the modified data 305b message are part of the same message or are sent at different times. Switching agent 340 may then send a snoop response (modified) 306a message to first node 310, the node that generated the invalidate request.

The modified data 305b message may contain a copy of the modified data for a location stored in cache 325. In the embodiment shown in FIG. 3, switching agent 340 forwards the modified data to the home node 330 as part of a memory update 306b message. In an embodiment!this message is sent by the switching agent 340 at the same time, or substantially the same time, as the snoop response (modified) 306a is sent to the first node 310. However, the messages may be sent at different time. The home node 330 may then write the modified data to the appropriate location in the memory 335 and send an update complete message 307 to switching agent 340. After receipt of this message, the switching agent 340 then may send an update complete message 308 to the first node 310. In an embodiment, when the first node has received a snoop response (modified) message, first node 310 will update the full line in the cache 309 with the new data only after receiving the update complete 308 message from the switching agent 340.

In another embodiment, if the first node 310 receives a snoop request from another node (e.g., second node 320) after receiving the update complete 308 message but before updating the full line in cache 309, then the first node does not update the full line in cache until after repeating the invalidate without data return procedure. Thus, if a snoop request is received within the time window between the receipt of update complete 308 and the performance of update full line in cache 309, then the first node will send a snoop response invalid to the node that sent the snoop request and will attempt to perform the actions designated 302 to 308 before performing update full line in cache 309. That is, the update of the cache line will be held. For example, if a snoop request is received within this time window from second node 320, after receiving the snoop request the first node will send a snoop response invalid to second node 320 and will again send an invalidate without data return 302. In this example, only after receiving the update complete message will first node 310 update the full line in cache 309. In another embodiment, for example where it can be guaranteed that first node 301 will not be interrupted while writing to cache 315, first node 301 will complete the updating of full line in cache 309 even if it receives a snoop request in the time window described above. In this embodiment, the first node will hold a snoop response until after completing the updating of the full line in cache 309.

Figure 4:
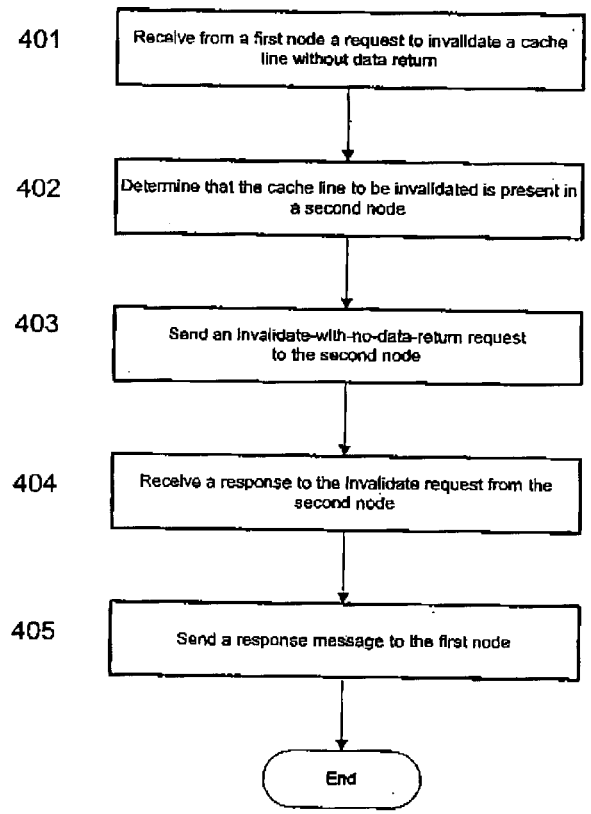
FIG. 4 is a flow diagram of a method of invalidating a cache line according to an embodiment of the present invention.

FIG. 4 is a flow diagram of a method of invalidating a cache line according to an embodiment of the present invention. The method may be performed by a switching agent in a multi-node system. According to this method, a request to invalidate a cache line without data return is received from a first node (401). The switching agent may determine that the cache line to be invalidated is present in a second node (402). The switching agent may then send an invalidate-without-data-return request to the second node (403). The switching agent may then receive a response to the invalidate request from the second node (404). In an embodiment, the second node has a clean copy of the cache line, and the response sent to the switching agent indicates that the cache line invalidated was clean. The switching agent may then send a response message to the first node (405). In the embodiment above, the response message indicates that the cache line was clean. In a further embodiment, the first node then updates the full cache line with the new data.

In a further embodiment, the cache line in the second node is in the modified state, and in response to the invalidate-without-data-return message the second node sends to the switching agent both a snoop response (modified) and a copy of the modified data. In this embodiment, the switching agent may send the modified data the home node, which may write the modified data to the memory. In this embodiment, however, the modified data is not returned to the first node.

Figure 5:
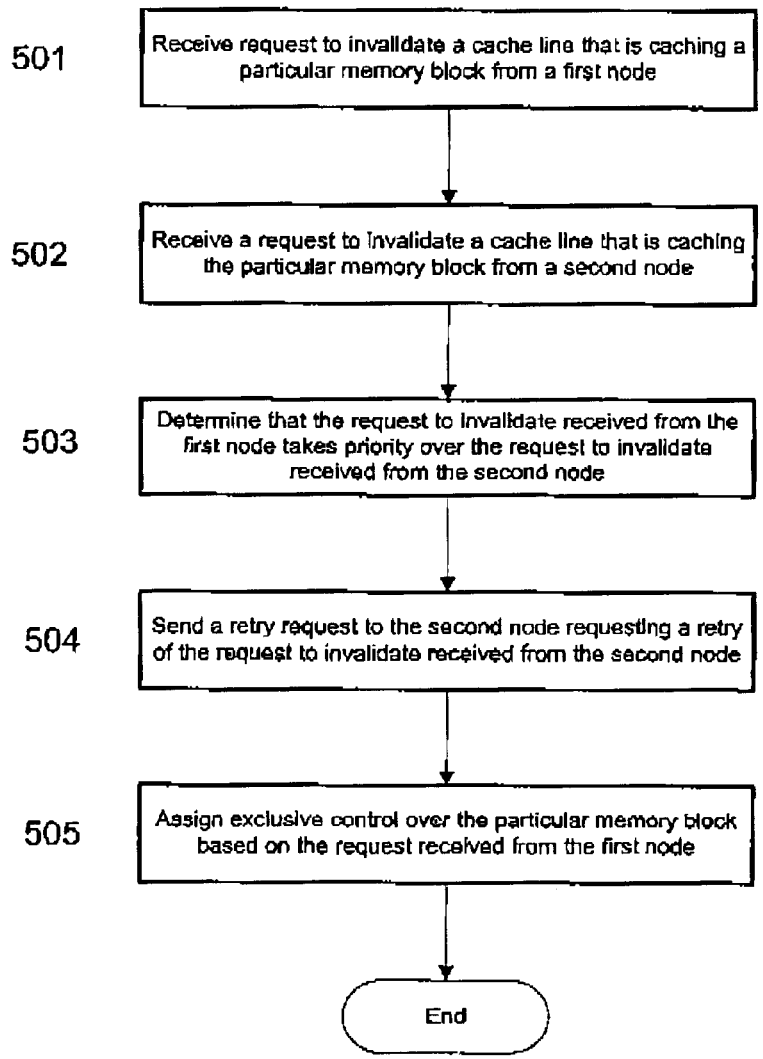
FIG. 5 is a flow diagram of a method of invalidating a cache line according to another embodiment of the present invention.

FIG. 5 is a flow diagram of a method of invalidating a cache line according to another embodiment of the present invention. A request to invalidate a cache line that is caching a particular memory block may be received from a first node (501). In an embodiment, the request may be a request to invalidate the cache line in another node without returning to the first node data stored in the cache line to be invalidated. A request to invalidate a cache line that is caching the particular memory block may be received from a second node (502). It may be determined that the request to invalidate received from the first node takes priority over the request to invalidate received from the second node (503). A retry request may be sent to the second node requesting a retry of the request to invalidate that was received from the second node (504). In an embodiment, exclusive control over the particular memory block may be assigned based on the request received from the first node (505). The method shown in FIG. 5 may be used with all or pads of the method shown in FIG 4 as appropriate.

The present invention may be used by a node in a multi-node system to invalidate a cache line in other nodes in the system without returning data from the invalidated cache lines to the first node. In an embodiment, the node that is requesting invalidation may obtain exclusive ownership of a memory block without requesting data. The memory block may or may not be present at the requesting node. The memory block is invalidated in all other nodes in the system. If the line is modified at a remote caching node, then the home memory (i.e., the system memory location that contains the memory block) is updated but data is not returned to the requesting node. This request is intended to be used for efficient handling of full line writes which the requesting node does not intend to keep in its cache (for example I/O DMA writes). Thus, the invention may be used where the first node is to store new data in the cache line that will not be dependent upon the old value of the data stored in corresponding copies of the cache line in other nodes.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, while the nodes in FIG. 1 are shown containing two/three processors, a node may contain any number of processors. In one embodiment, a node contains only one processor, and in another embodiment a node contains sixteen processor. As another example, while the nodes in FIG I are connected through switching agent 140, in another embodiment two nodes may be directly connected to each other. For example, in a system that has two nodes, the node controller of a first node may be connected to the node controller of a second node. In another embodiment, the switching agent might be integrated into the node controllers in an integrated manner. In a further embodiment, both node controller and the switching agent could be integrated directly on the processor. In addition, while the requesting node may be invalidating the cache line because it is writing new data to the cache line, the requesting node may invalidate a cache line due to other types of access to a data block. Also, while graphics and I/O data are two examples of the type of data that is stored in a memory block that is invalidated by the present invention, the invention may also be used with memory blocks that store other types of data.

We claim:

1. A method of invalidating a cache line in a system having a plurality of nodes that include a processor and a cache memory, the method comprising:

receiving from a first node a request to invalidate a cache line that is caching a particular memory block, wherein said request is a request to invalidate the cache line in another node without returning to the first node data stored in the cache line to be invalidated;

receiving from a second node a request to invalidate a cache line that is caching said particular memory block;

determining that the request to invalidate that was received from the first node takes priority over the request to invalidate that was received from the second node; and sending a retry request to the second node requesting a retry of the request to invalidate that was received from the second node.

2. The method of claim 1, wherein the request received from the first node requires that data stored in the cache line to be invalidated is not returned to the first node even if the cache line to be invalidated is in the modified state.

3. The method of claim 1, wherein the method further comprises:

determining that a cache line to be invalidated in said another node is in the modified state; and writing data from the cache line to be invalidated in said another node to a memory for which the data is being cached.

4. The method of claim 3, wherein the method further comprises writing new data to a cache line in the first node, and wherein said cache line in the first node is caching the particular memory block.

5. The method of claim 1, wherein the method further comprises writing new data to a cache line in the first node, and wherein said cache line in the first node is caching the particular memory block.

6. The method of claim 1, wherein the method further comprises assigning exclusive control over the particular memory block based on the request received from the first node.

7. A switching agent comprising:

a switching agent first input to receive from a first node a first request to invalidate without data return a cache line that caches for a particular memory block;

a coherency manager to determine from said first request that a second node contains a cache line that caches data for said memory block;

a switching agent first output to send to the second node a second request to invalidate said cache line; and a switching agent second output to send to the first node an invalidation completed message without returning data that was stored in the invalidated cache line to the first node.

8. The switching agent of claim wherein the switching agent further comprises:

a switching agent second input to receive from said second node data that was stored in the invalidated cache line, wherein the received data was modified; and a switching agent third output to send the received modified data to a third node that includes a memory device for which the cache line is caching data.

9. The switching agent of claim 7, wherein the coherency manager further comprising a memory manager.

10. A system comprising:
a first node that includes:
   a first processor;
   a first cache coupled to the first processor;
   an output to send requests to invalidate a cache line without data return even if the cache line is in the modified state and to send requests to read-and-invalidate a cache line and
a second node coupled to the first node that includes:
   a second processor;
   a second cache coupled to the second processor; and
   an input coupled to the second processor to receive requests.

11. The system of claim 10, wherein the system further comprises a switching agent coupled to the first node and the second node, and wherein the first node is coupled to the second node through the switching agent.

12. The system of claim 11, wherein the switching agent contains a coherency manager to receive requests from the first node, to determine that a particular cache line is stored in the second node, and to send a request to invalidate said cache line to the second node.

13. The system of claim 12, wherein the coherency manager sends a retry request to the first node if the cache line to be invalidated is in the modified state in the second node and the request received from the first node was a cache line invalidate request.

14. An apparatus comprising:
   an input to receive from a first node a request to invalidate a cache line that is caching a particular memory block, wherein said request is a request to invalidate the cache line in another node without returning to the first node data stored in the cache line to be invalidated;
   an input to receive from a second node a request to invalidate a cache line that is caching said particular memory block;
   a coherency manager to determine that the request to invalidate that was received from the first node takes priority over the request to invalidate that was received from the second node; and
   an output to send a retry request to the second node requesting a retry of the request to invalidate that was received from the second node.

15. The apparatus of claim 14, wherein the request received from the first node requires that data stored in the cache line to be invalidated is not returned to the first node even if the cache line to be invalidated is in the modified state.

16. The apparatus of claim 14, wherein the coherency manager further is to determine that a cache line to be invalidated in said another node is in the modified state and to write data from the cache line to be invalidated in said another node to a memory for which the data is being cached.

17. The apparatus of claim 16, wherein the coherency manager writes new data to a cache line in the first node, and wherein said cache line in the first node is caching the particular memory block.

18. The apparatus of claim 14, wherein the coherency manager further writes new data to a cache line in the first node, and wherein said cache line in the first node is caching the particular memory block.

19. The apparatus of claim 14, wherein the coherency manager further assigns exclusive control over the particular memory block based on the request received from the first node.

* * * * *

UNITED STATES PATENT AND TRADEMARK OFFICE
CERTIFICATE OF CORRECTION

PATENT NO. : 6,772,298 B2
DATED : August 3, 2004
INVENTOR(S) : Khare et al.

It is certified that error appears in the above-identified patent and that said Letters Patent is hereby corrected as shown below:

Column 8,
Line 58, change "agent of claim wherein" to -- agent of claim 7 wherein --.
Line 67, change "further comprising" to -- further comprises --.

Column 9,
Line 8, change "invalidate a cache line and" to -- invalidate a cache line; and --.

Signed and Sealed this

Twenty-eighth Day of June, 2005

JON W. DUDAS
*Director of the United States Patent and Trademark Office*